US008708272B1

(12) United States Patent
Jones et al.

(10) Patent No.: US 8,708,272 B1
(45) Date of Patent: Apr. 29, 2014

(54) LANDING GEAR DOOR LINERS FOR AIRFRAME NOISE REDUCTION

(75) Inventors: Michael G. Jones, Newport News, VA (US); Brian M. Howerton, Newport News, VA (US); Thomas Van De Ven, Savannah, GA (US)

(73) Assignee: The United States of America as represented by the Administrator of National Aeronautics and Space Administration, Washington, DC (US)

( * ) Notice: Subject to any disclaimer, the term of this patent is extended or adjusted under 35 U.S.C. 154(b) by 0 days.

(21) Appl. No.: 13/417,349

(22) Filed: Mar. 12, 2012

Related U.S. Application Data

(60) Provisional application No. 61/451,730, filed on Mar. 11, 2011, provisional application No. 61/451,727, filed on Mar. 11, 2011, provisional application No. 61/451,735, filed on Mar. 11, 2011, provisional application No. 61/597,282, filed on Feb. 10, 2012.

(51) Int. Cl.
*B64C 1/40* (2006.01)
(52) U.S. Cl.
USPC .......................................................... 244/1 N
(58) Field of Classification Search
USPC .................... 244/1 N, 100 R, 102 R, 133
See application file for complete search history.

(56) References Cited

U.S. PATENT DOCUMENTS

| 3,612,146 | A | 10/1971 | Klein |
| 3,779,338 | A | 12/1973 | Hayden et al. |
| 3,821,999 | A | 7/1974 | Guess et al. |
| 3,853,428 | A | 12/1974 | Hayden et al. |
| 4,240,250 | A | 12/1980 | Harris |
| 4,836,469 | A * | 6/1989 | Wagenfeld ............... 244/1 N |
| 5,543,198 | A * | 8/1996 | Wilson ..................... 428/116 |
| 6,454,219 | B1 | 9/2002 | Moe |
| 6,948,906 | B2 | 9/2005 | Leishman et al. |
| 7,458,542 | B2 * | 12/2008 | Chow et al. ............ 244/102 R |
| 7,484,930 | B2 | 2/2009 | Hutcheson et al. |
| 7,637,462 | B2 | 12/2009 | Pal |
| 7,866,939 | B2 * | 1/2011 | Harper et al. ................ 415/9 |
| 7,954,757 | B2 * | 6/2011 | Moe et al. .............. 244/100 A |
| 7,967,108 | B2 * | 6/2011 | Harper .................... 181/292 |
| 8,033,510 | B2 | 10/2011 | Shmilovich et al. |
| 8,056,850 | B2 | 11/2011 | Lin et al. |
| 8,096,513 | B2 | 1/2012 | Mau et al. |
| 2004/0197194 | A1 | 10/2004 | Leishman et al. |
| 2007/0020099 | A1 | 1/2007 | Hutcheson et al. |
| 2008/0179448 | A1 * | 7/2008 | Layland et al. ............ 244/1 N |

(Continued)

OTHER PUBLICATIONS

Tony L. Parrott, et al, "Parallel-element liner impedances for improved absorption of broadband sound in ducts." Noise Control Engineering Journal, Nov.-Dec. 1995, pp. 183-195, vol. 43(6).

(Continued)

*Primary Examiner* — Tien Dinh
*Assistant Examiner* — Keith L Dixon
(74) *Attorney, Agent, or Firm* — Andrea Z. Warmbier

(57) ABSTRACT

A landing gear door for retractable landing gear of aircraft includes an acoustic liner. The acoustic liner includes one or more internal cavities or chambers having one or more openings that inhibit the generation of sound at the surface and/or absorb sound generated during operation of the aircraft. The landing gear door may include a plurality of internal chambers having different geometries to thereby absorb broadband noise.

17 Claims, 5 Drawing Sheets

(56) References Cited

U.S. PATENT DOCUMENTS

| | | | |
|---|---|---|---|
| 2009/0084905 A1 | 4/2009 | Mau et al. | |
| 2010/0133378 A1* | 6/2010 | Lidoine | 244/1 N |
| 2010/0294883 A1 | 11/2010 | Trich, Jr. et al. | |
| 2013/0062143 A1* | 3/2013 | Ichihashi | 181/292 |

OTHER PUBLICATIONS

L. S. Wirt, "Analysis, Testing, and Design of Lined Ducts," The Journal of the Acoustical Society of America, May 1972, pp. 1448-1463, vol. 51(5), Part 1.

Tony L. Parrott, et al., "Effect of Resonator Axis Skew on Normal Incidence Impedance," AIAA 2003-3307, 9th AIAA/CEAS Aeroacoustics Conference, May 12-14, 2003, pp. 1-8, Hilton Head, South Carolina.

Brian M. Howerton, et al., "Validation of an Acoustic impedance Prediction Model for Skewed Resonators," AIAA 2009-3143, May 2009, pp. 1-21.

M. G. Jones, et al., "Assessment of Soft Vane and Metal Foam Engine Noise Reduction Concepts," AIAA 2009-3142, May 2009, pp. 1-20.

Mehdi R. Khorrami, et al., "Application of Passive Porous Treatment to Slat Trailing Edge Noise," NASA/TM-2003-212416, May 2003, pp. 1-14.

Mehdi R. Khorrami, et al., "Novel Approach for Reducing Rotor Tip-Clearance-Induced Noise in Turbofan Engines," AIAA Journal, Aug. 2002, pp. 1618-1528, vol. 40, No. 8.

Meelan Choudhari, et al., "Computational Study of Porous Treatment for Altering Flap Side-Edge Flowfield," AIAA 2003-3113, 9th AIAA/CEAS Aeroacoustics Conference, May 12-14, 2003, pp. 1-15, Hilton Head, South Carolina.

W. Clifton Horne, et al., "Measurements of 26%-scale 777 Airframe Noise in the NASA Ames 40-by 80 Foot Wind Tunnel," AIAA 2005-2810, 11th AIAA/CEAS Aeroacoustics Conference (26th AIAA Aeroacoustics Conference), May 23-25, 2005, pp. 1-19, Monterey, California.

D. Angland, et al., "Measurements of Flow around a Flap Side-Edge with Porous Edge Treatment." AIAA 2006-213. 44th AIAA Aerospace Sciences Meeting and Exhibit, Jan. 9-12, 2006, pp. 1-22, Reno. Nevada.

D. Angland, et al., "Measurements of Flow around a Flap Side Edge with Porous Edge Treatment," AIAA Journal, Jul. 7, 2009, pp. 1660-1671, vol. 47, No. 7.

\* cited by examiner

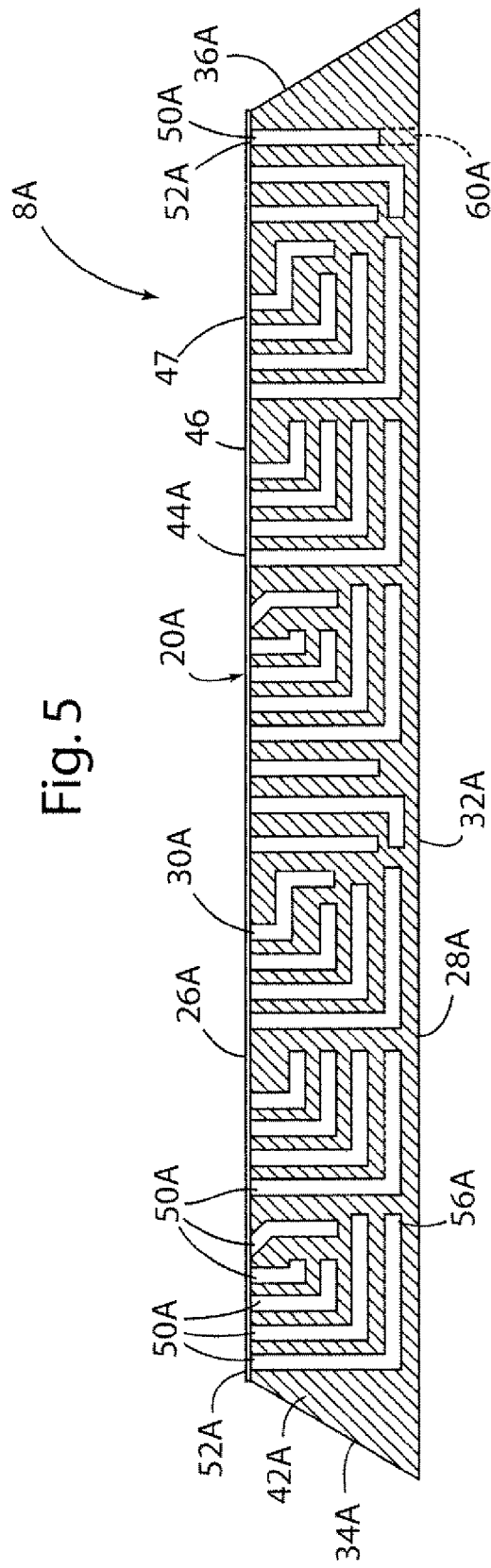

LANDING GEAR DOOR LINERS FOR AIRFRAME NOISE REDUCTION

CROSS-REFERENCE TO RELATED APPLICATIONS

This application is related to co-pending U.S. patent application Nos. 13/417,347 and 13/417,351, filed on Mar. 12, 2012. This application claims the benefits of U.S. Provisional Application Nos. 61/451,727, filed on Mar. 11, 2011; 61/451,730 filed on Mar. 11, 2011; 61/451,735 filed on Mar. 11, 2011; and 61/597,282, filed on Feb. 10, 2012, the entire contents of all which are incorporated by reference.

STATEMENT REGARDING FEDERALLY SPONSORED RESEARCH OR DEVELOPMENT

The invention described herein was made in part by employees of the United States Government and may be manufactured and used by or for the Government of the United States of America for governmental purposes without the payment of any royalties thereon or therefore.

FIELD OF THE INVENTION

The present invention relates to reduction of aircraft noise, and specifically to acoustic liners to reduce airframe noise during takeoff and landing.

BACKGROUND OF THE INVENTION

Aircraft noise is a significant issue with economic and public health implications, especially for communities near airports. As a result, increasingly stringent international constraints are being placed on aircraft companies to reduce this noise. Aircraft noise is generally divided into two categories. The first has to do with noise generated by the propulsion system, while the second is related to noise generated by the interaction of mean flow over the airframe as it traverses through the air.

BRIEF SUMMARY OF THE INVENTION

One aspect of the present invention is a landing gear door of the type that covers retractable landing gear of an aircraft when the landing gear is retracted during flight. The landing gear door shifts outwardly when the landing gear is deployed. The landing gear door includes a door structure defining first and second opposite sides. The first and second opposite sides have first and second opposite surfaces, respectively. The door structure further includes edge surfaces extending between the first and second sides, and the door structure defines an internal structure disposed between the first and second opposite sides. The door structure defines a porous surface on at least one of the first and second opposite side surfaces, and the internal structure defines at least one internal acoustic chamber or passageway defining a first end that is acoustically connected to the porous surface such that at least a substantial portion of sound entering the elongated acoustic chamber or passageway at the first end thereof is absorbed by the internal structure of the landing gear door. The internal acoustic chambers or passageways may be elongated. The landing gear door may include a plurality of internal acoustic chambers, each having the same length, or one or more of the chambers may have a different length than one or more of the other chambers. The internal chambers may be substantially linear, or they may include angled portions that extend at angles that are typically in the range of about 30° to about 90° relative to other portions of the chambers. One or more of the internal acoustic chambers may be partially or completely filled with an acoustic bulk material such as foam or other suitable material to provide the desired propagation and absorption of sound within the internal acoustic chambers. The chambers may have closed inner ends, or the chambers may have open opposite ends whereby sound entering one of the openings is transmitted through the chamber, and a portion of the sound that is not absorbed in the chamber is emitted from the other opening. The chambers thereby form passageways whereby sound can thereby be transmitted between inner and outer surfaces of the landing gear door, or between different locations on the same surface of the landing gear door.

These and other features, advantages, and objects of the present invention will be further understood and appreciated by those skilled in the art by reference to the following specification, claims, and appended drawings.

BRIEF DESCRIPTION OF THE DRAWINGS

FIG. 5 is a cross-sectional view of the landing gear door of FIG. 4 taken along the line V-V.

DETAILED DESCRIPTION OF EMBODIMENTS

Figure 1:
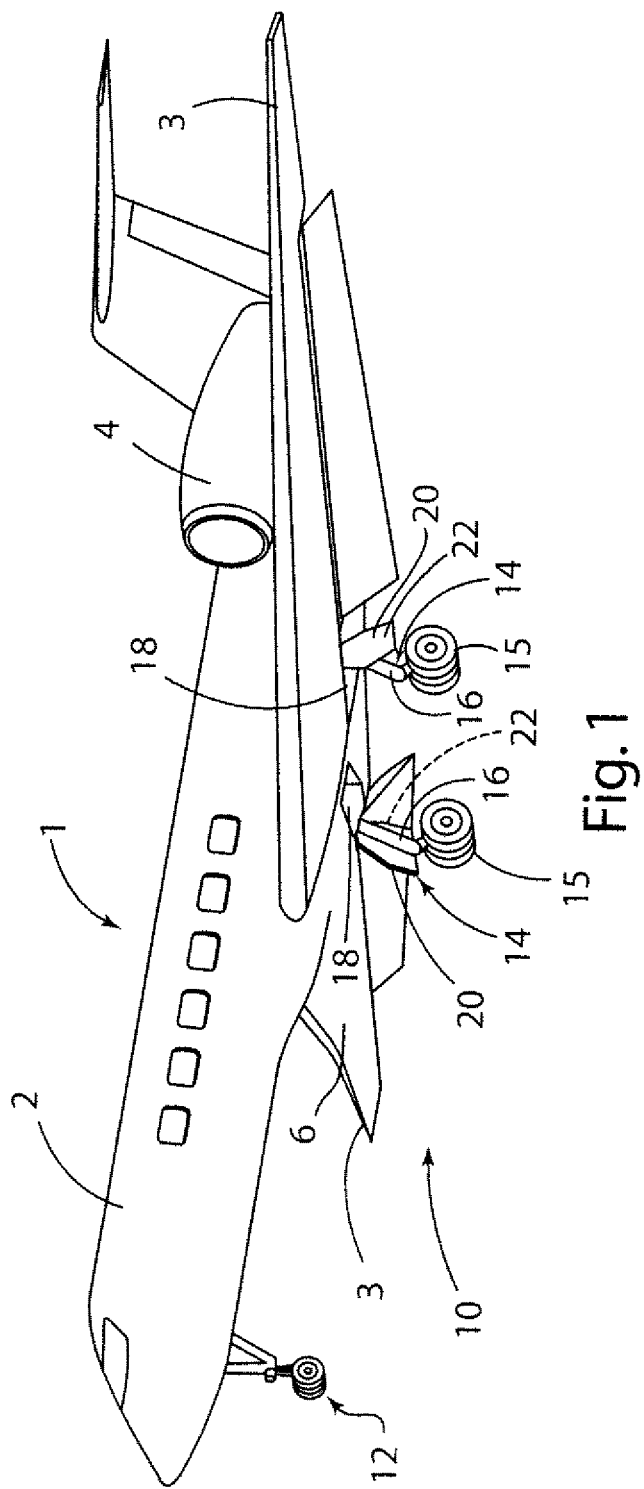
FIG. 1 is an isometric view of an aircraft including retractable landing gear and landing gear doors according to one aspect of the present invention.

For purposes of description herein, the terms "upper," "lower," "right," "left," "rear," "front," "vertical," "horizontal," and derivatives thereof shall be related to the invention as oriented in FIG. 5. However, it is to be understood that the invention may assume various alternative orientations, except where expressly specified to the contrary. It is also to be understood that the specific devices and processes illustrated in the attached drawing, and described in the following specification are simply exemplary embodiments of the inventive concepts defined in the appended claims. Furthermore, references to specific items or features (e.g. a wing structure, leading edge slat, and slat cove filler) shall not be construed as limiting the item or feature to one-piece or multi-piece items or features. Hence, specific dimensions and other physical characteristics relating to the embodiments disclosed herein are not to be considered as limiting, unless the claims expressly state otherwise.

An aircraft 1 (FIG. 1) includes a fuselage 2, wings 3, and a propulsion system such as jet engines 4. The primary aircraft structure including the fuselage 2, wings 3, and engine 4 may comprise a known design and these parts of aircraft 1 will not therefore be described in detail herein.

With reference to FIG. 1, Aircraft 1 includes a retractable landing gear system 10 including a nose assembly 12, and two main assemblies 14. The main assemblies 14 include tires 15, struts 16, and doors 20. During takeoff and landing, the landing gear is in a deployed position as shown in FIG. 1. During level flight, the landing gear is retracted such that the tires 15, struts 16, and other related components are received in landing gear bays or cavities 18. When the main assemblies 14 are retracted, outer surfaces 22 of landing gear doors 20 are flush with outer surfaces 6 of the fuselage 2 and/or wings 3. The tires 15, struts 16, and associated powered actuators (not shown) and other such components are generally known, and will not therefore be described in detail herein.

Figure 2:
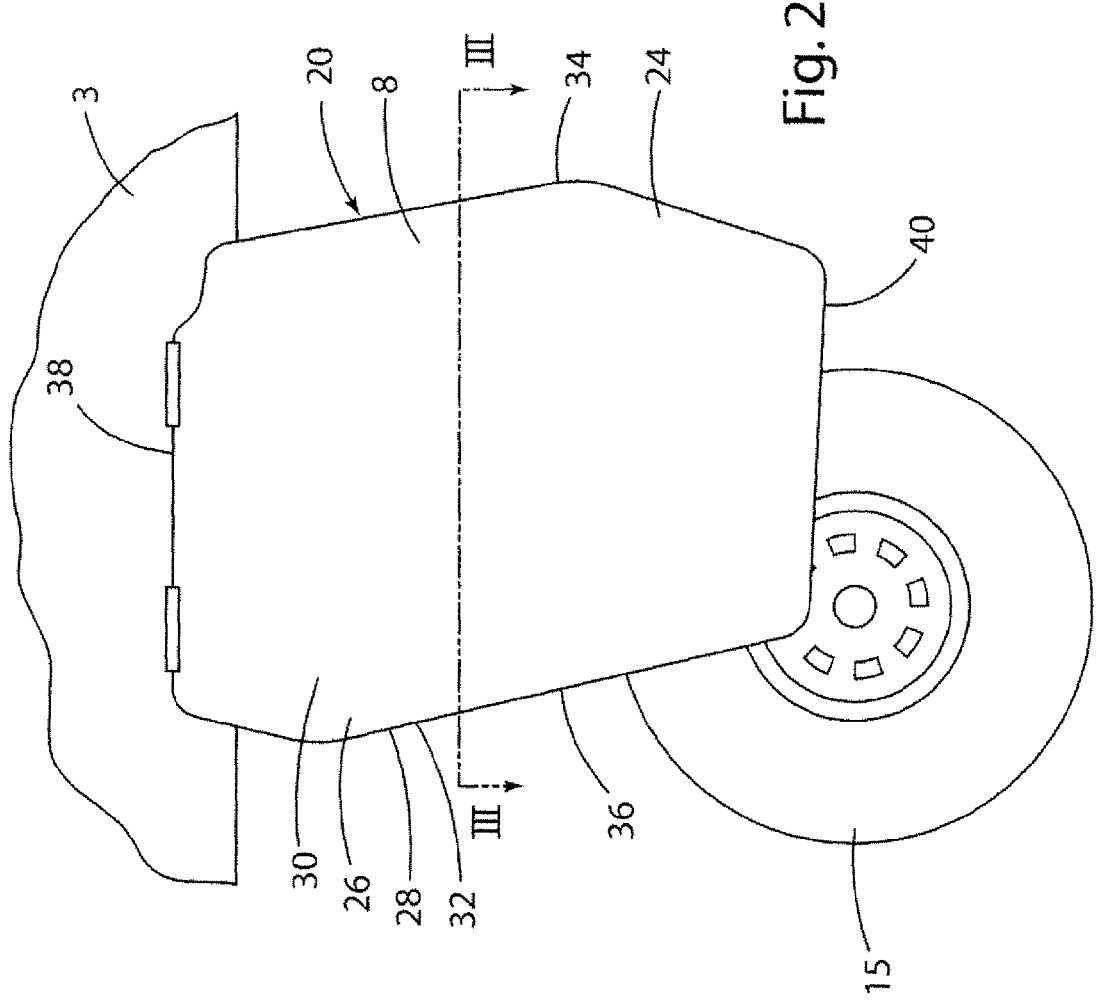
FIG. 2 is a partially fragmentary enlarged view of the main landing gear of the aircraft of FIG. 1.
Figure 3:
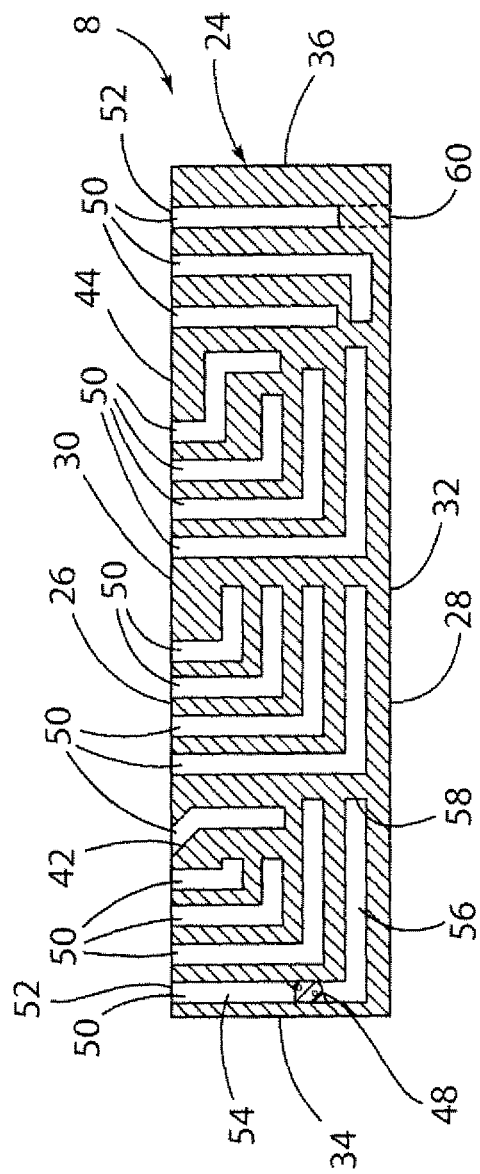
FIG. 3 is a cross-sectional view of the landing gear door of FIG. 2 taken along the line III-III.

With further reference to FIGS. 2 and 3, landing gear door 20 includes a door structure 24 defining first and second opposite sides 26 and 28. The opposite sides 26 and 28 include first and second opposite surfaces 30 and 32, respectively. Edge surfaces 34, 36, 38, and 40 extend between the first and second sides 26 and 28 of door structure 24. It will be understood that the landing gear door 20 and door structure 24 may have a variety of different shapes and sizes as required for a particular aircraft design.

The door structure 24 also defines an acoustic liner 8 comprising an internal structure or body 42 disposed between the first and second opposite sides 26 and 28. The door structure 24 includes a porous surface 44 on at least one of the first and second opposite side surfaces 30 and 32. The internal structure 42 defines at least one internal acoustic chamber 50. The internal acoustic chambers 50 have first ends 52 that are acoustically connected to the porous surface 44 such that at least a substantial portion of sound entering the acoustic chambers 50 at the first end 52 is absorbed by the internal structure 42 of the landing gear door 20.

Referring again to FIG. 3, acoustic chambers 50 of acoustic liner 8 may include an outer end portion 54 that extends substantially transverse or perpendicular to porous surface 44, and an inner end portion 56 that extends transverse to the outer end portion 54. The inner end portion 56 may extend substantially parallel to porous surface 44. The acoustic chambers 50 may have inner closed ends 58, such that openings 52 comprise the only openings that permit sound to enter the acoustic chambers 50. Alternately, one or more of the acoustic chambers 50 may extend all the way through the internal structure 42 to thereby form an internal passageway with openings 52 and 60 on opposite sides 26 and 28, respectively, of door structure 42.

The internal chambers 50 may have circular cross-sectional shapes, and the cross-sectional area of the internal chambers 50 may be substantially constant along the length of the internal chambers 50. Alternately, the chambers 50 may have non-circular cross-sectional shapes (e.g., quadrilateral shaped), and/or the cross-sectional area of the chambers 50 may vary.

Also, as shown in FIG. 3, different internal chambers 50 of acoustic liner 8 may have different lengths defined between ends 52 and 58. The differences in lengths provide for absorption of sound at different frequencies. Thus, acoustic liner 8 of door 20 may be configured to absorb a broad spectrum of sound utilizing internal acoustic chambers 50 of different lengths and/or different shapes.

Porous surface 44 of acoustic liner 8 may comprise a thin sheet of metal or other suitable material having a plurality of perforations therethrough. Alternately, porous surface 44 may comprise a mesh or the like, or the porous surface 44 may be formed by the internal structure 42 itself, Acoustic filler material 48 such as foam or other suitable material may be positioned in one or more of the internal chambers 50, and the filler material 48 may partially or completely fill the chambers 50. The internal structure 42 may comprise a metal material, fiber composites, or other suitable material.

Figure 4:
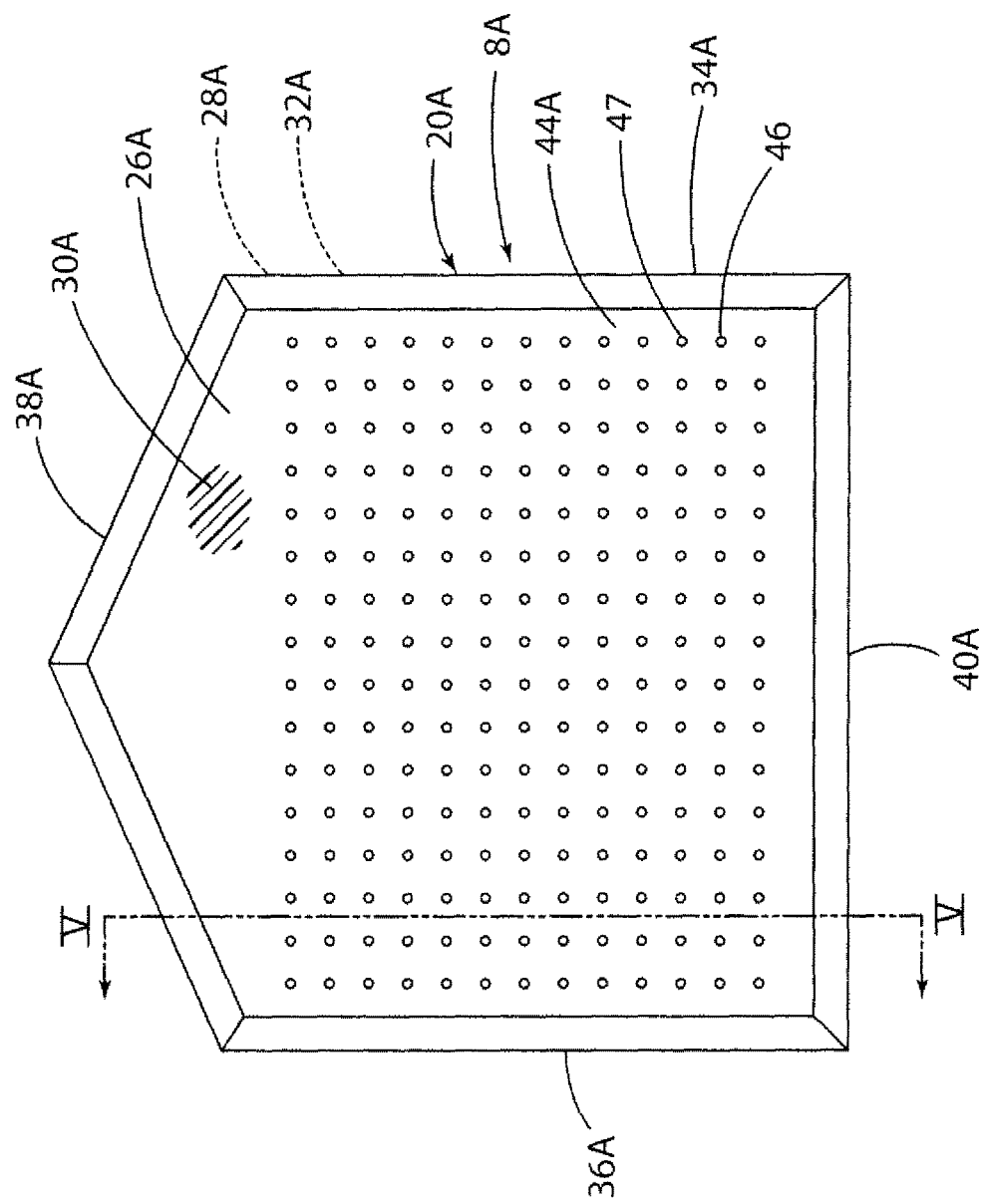
FIG. 4 shows a landing gear door according to another aspect of the present invention.

With further reference to FIGS. 4 and 5, a landing gear door 20A according to another aspect of the present invention includes an acoustic liner 8A having an internal structure 42A, and a plurality of internal acoustic chambers 50A. Each chamber 50A has a first or outer end/opening 52A, and an inner end 36A that may optionally be open at the second opposite side 28A of door 20A or at a different location on the same side 26A or door 20A. Porous surface 44A of acoustic liner 8A comprises a sheet of material 46 having a plurality of perforations 47 such that the ends 52A of acoustic chambers 50A are acoustically open at the surface 30A of door 20A. One or more of the acoustic chambers 50A may include an open end 60A on opposite side 28A of door 20A to thereby foiin a passageway that permits sound to travel through the door 20A from first side 26A to second side 28A, and vice-versa. One or more of the acoustic chambers 50A may alternatively include an open end on the same side 26A of door 20A to thereby form a passageway that permits sound to travel through the door 20A from first side 26A to another location on the same side. Similarly, one or more of the chambers may alternatively include two open ends within the second side 28A such that sound is permitted to travel through the door 20A from one location to another on the second side 28A.

The acoustic treatment embedded within the volume of the landing gear doors 20 and 20A changes the boundary condition at the surface(s) 30 (and 32) such that sound is absorbed within the door 20 or 20A. The internal acoustic chambers 50A and porous surface 44 of liners 8 and 8A also change the boundary conditions of the door 20 to inhibit the generation of noise at the surface 30 and/or 32.

As discussed above, the lengths of internal acoustic chambers 50A of the liner 8A of door 20A (FIG. 5) are varied. If the partitions between adjacent internal chambers are impervious and sufficiently close together, this provides a local-reacting liner configuration, and each chamber in this embodiment behaves as a quarter-wavelength resonator (sometimes called an organ-pipe resonator). In this embodiment, the different lengths of the chambers 50 are selected for optimal absorption of different frequencies. By proper selection of the combination of lengths of the chambers 50, a broadband sound absorber can be achieved.

If the internal volume defined by chambers 50 is filled with foam 48 or the like, sound that enters through the porous surface 44 of the liner 8 of door 20 travels in multiple directions within the foam. If configured in this way, the sound can travel in multiple directions, and exit the liner 8 of door 20 via different portions of the porous surface 44. The chambers 50 may include openings at opposite ends at surface 30 and 32, or the acoustic chambers 50 may have multiple openings at surface 30 or multiple openings at surface 32. Surface 32 may also comprise a porous surface 44 having a sheet 46 with perforations 47.

It will be understood that the specific acoustic liner configurations and door geometries discussed above in connection with FIGS. 2-5 are examples of suitable geometries, but the present invention is not limited to these configuration and/or geometries. There are many designs that could be used to achieve similar surface acoustic impedance boundary conditions. This can be done by suitably varying the geometry of the internal cavities 50 and the surface face sheet 46.

The sound-absorbing liner and landing gear door discussed above are utilized for main landing gear assemblies 14 (FIG. 1). However, it will be understood that acoustic liners and doors according to the present invention may be utilized in connection with a variety of different retractable landing gear configurations. Thus, the shape and size of the acoustic liners and doors may therefore vary significantly when utilized for different applications.

It is to be understood that variations and modifications can be made on the aforementioned structure without departing from the concepts of the present invention, and further it is to be understood that such concepts are intended to be covered by the following claims unless these claims by their language expressly state otherwise,

The invention claimed is:

1. A landing gear door that covers retractable landing gear of an aircraft when the landing gear is retracted during flight, and shifts outwardly when the landing gear is deployed, the landing gear door comprising:
   a door structure defining first and second opposite sides having first and second opposite surfaces, respectively, and edge surfaces extending between the first and second sides, the door structure further defining an internal structure disposed between the first and second opposite sides, wherein the door structure defines a porous surface on at least one of the first and second opposite side surfaces, and wherein the internal structure defines a plurality of internal acoustic chambers each defining a first end that is acoustically connected to the porous surface such that at least a substantial portion of sound entering the acoustic chamber at the first end is absorbed by the internal structure of the landing gear door;
   wherein each of the plurality of internal acoustic chambers defines a second end disposed in spaced relationship to the porous surface, with a length extending between each of the first ends and second ends and wherein at least one of the plurality of internal acoustic chambers includes first and second portions that extend transverse relative to each other at an angle in the range of about 30° to 90°; and,
   wherein the lengths of at least two of the plurality of internal acoustic chambers are different from one another.

2. The landing gear door of claim 1, wherein:
   the porous surface is disposed on the first side of the door structure, and wherein at least two of the internal acoustic chambers have first ends that are acoustically connected to the porous surface.

3. The landing gear door of claim 2, wherein:
   the porous surface comprises a thin sheet of material having a plurality of perforations therethrough.

4. The landing gear door of claim 3, wherein:
   the perforations are arranged in a repeating pattern.

5. The landing gear door of claim 4, wherein:
   the thin sheet of material comprises metal.

6. The landing gear door of claim 1 wherein:
   at least two of the internal acoustic chambers have closed second ends and wherein at least one of the two acoustic chambers defines an outer portion adjacent the first end that extends transverse relative to the porous surface, and an inner portion at the second end that extends transverse relative to the outer portion.

7. The landing gear door of claim 6, wherein:
   at least one of the inner and outer portions is substantially linear.

8. The landing gear door of claim 7, wherein:
   at least a portion of at least one of the acoustic chambers has a circular cross-sectional shape.

9. The landing gear door of claim 8, wherein:
   the inner and outer portions of at least one of the acoustic chambers are both substantially linear whereby the chamber is L-shaped.

10. The landing gear door of claim 1, wherein:
    at least a first one of the internal acoustic chambers is substantially linear along its length and at least a second one of the internal acoustic chambers is substantially non-linear along its length.

11. The landing gear door of claim 1, wherein:
    the plurality of internal acoustic chambers is further defined as first and second internal acoustic chambers, each having an outer end at the porous surface defining a sole external opening to each of the internal acoustic chambers and wherein each chamber further includes an opposite inner end that is closed whereby sound cannot escape from the inner ends of the internal acoustic chambers.

12. The landing gear door of claim 11, wherein:
    at least one of the plurality of acoustic chambers extends substantially linearly from the outer end to the inner end.

13. The landing gear door of claim 1, including:
    acoustic filler material disposed in at least a portion of the plurality of at least internal acoustic chamber.

14. The landing gear door of claim 1, wherein:
    the first opposite surface of the door structure comprises a smooth, generally planar aerodynamic surface that tends to permit non-turbulent airflow over the surface.

15. The landing gear door of claim 1, wherein:
    the internal structure defines at least one internal acoustic chamber having first and
    second ends that are open at the porous surface whereby sound can enter at the first end and exit
    at the second end.

16. The landing gear door of claim 15, wherein:
    the first end is disposed on the first opposite side of the door structure, and the second
    end is disposed on the second opposite side of the door structure.

17. The landing gear door of claim 15, wherein:
    the first and second ends are both disposed on one side of the door structure.

* * * * *